United States Patent [19]

Jorquez

[11] Patent Number: 4,580,685

[45] Date of Patent: Apr. 8, 1986

[54] FLOPPY DISK STORAGE STAND

[76] Inventor: James S. Jorquez, 922 W. Moreland Ave., Phoenix, Ariz. 85007

[21] Appl. No.: 668,080

[22] Filed: Nov. 5, 1984

[51] Int. Cl.⁴ .............................................. A47F 7/16
[52] U.S. Cl. ...................................... 211/56; 211/131
[58] Field of Search ................... 211/56, 58, 55, 163, 211/129, 131, 169

[56] References Cited

U.S. PATENT DOCUMENTS

| 213,681 | 3/1879 | Norris | 211/55 X |
| 302,615 | 7/1884 | Wilson | 211/56 X |
| 735,614 | 8/1903 | Stevens | 211/56 X |
| 1,141,274 | 6/1915 | Skall | 211/56 X |
| 1,235,225 | 7/1917 | Miller | 211/56 X |
| 1,432,277 | 10/1922 | Cahusac | 211/56 |
| 2,443,320 | 6/1948 | Meyer et al. | 211/56 |

Primary Examiner—Robert W. Gibson, Jr.
Assistant Examiner—Sarah A. Lechok Eley
Attorney, Agent, or Firm—Drummond & Nissle

[57] ABSTRACT

A storage and display stand for floppy computer memory disks. Each disk includes an upper portion and a lower portion. The display stand includes a base; a rotatable drum mounted on the base to rotate about a vertically disposed central axis, the drum including an outer peripheral generally vertically oriented surface spaced away from and circumscribing the central axis; and, a plurality of storage pockets carried on the peripheral surface. Each storage pocket is shaped and dimensioned to receive the lower portion of a memory disk such that the upper portion of the disk extends visably upwardly from the pocket.

4 Claims, 7 Drawing Figures

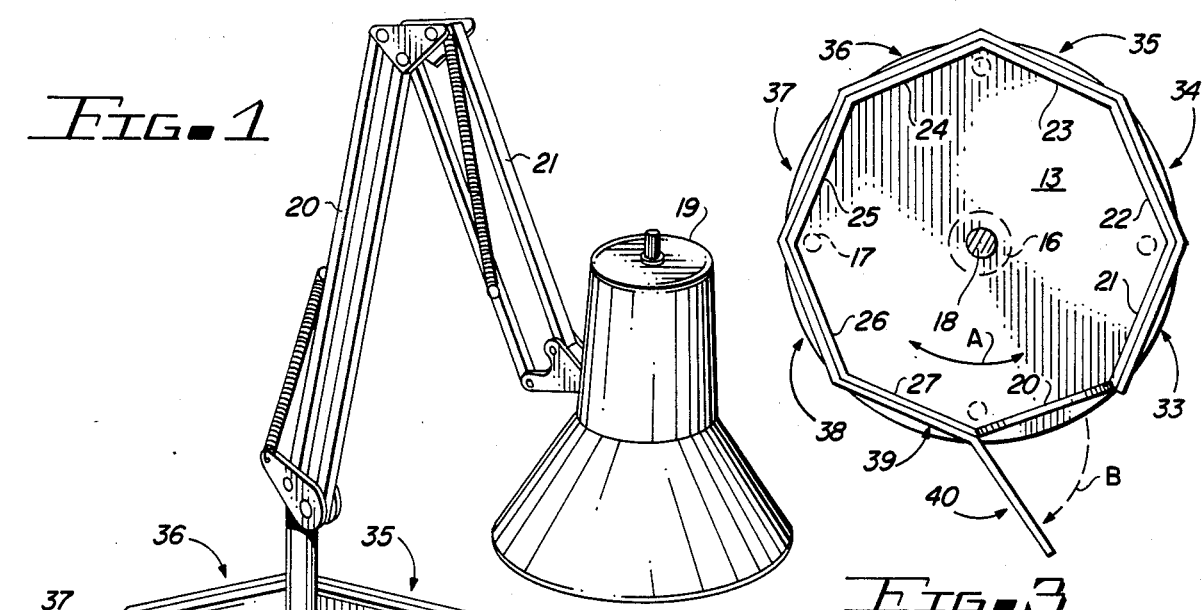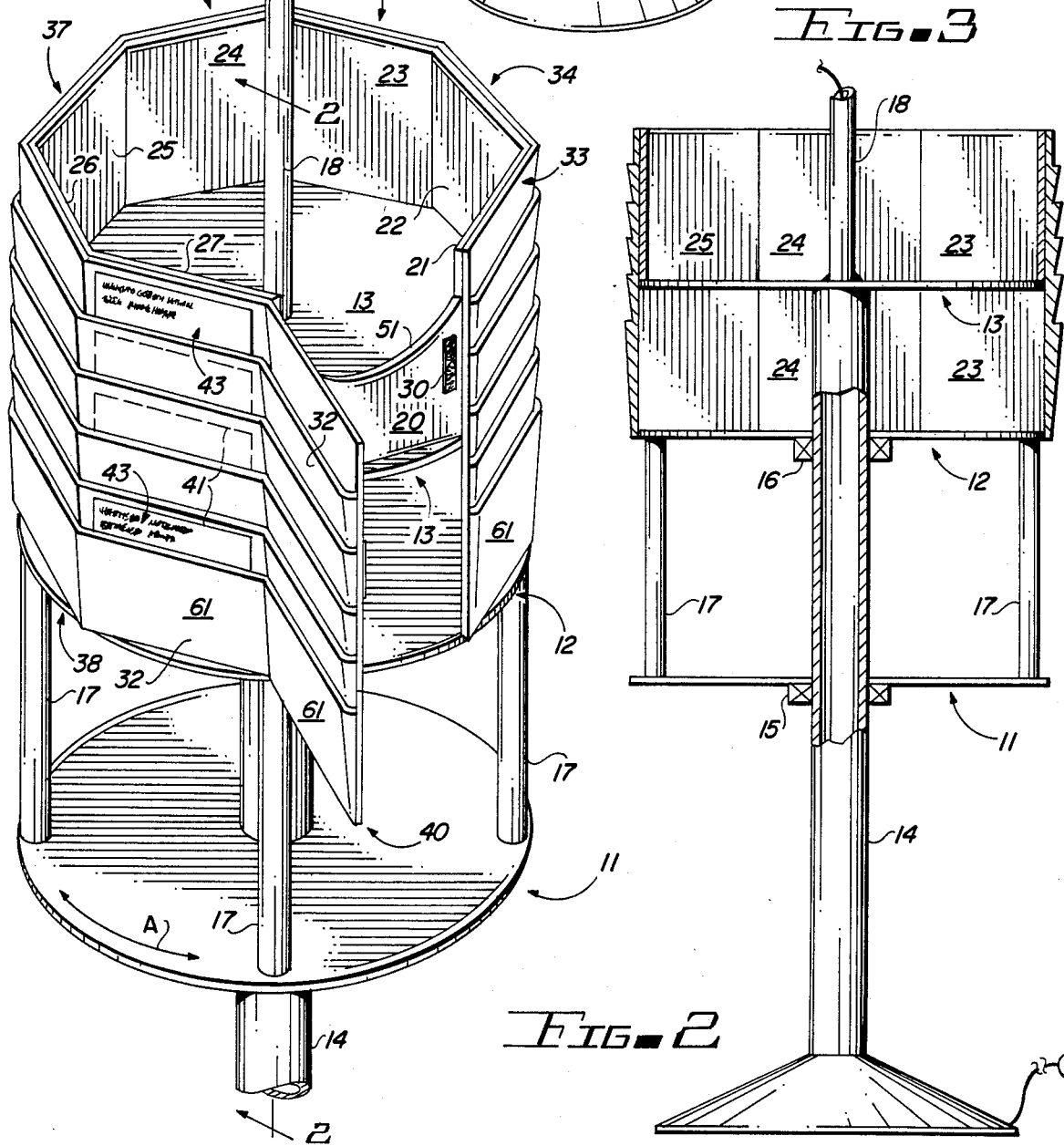

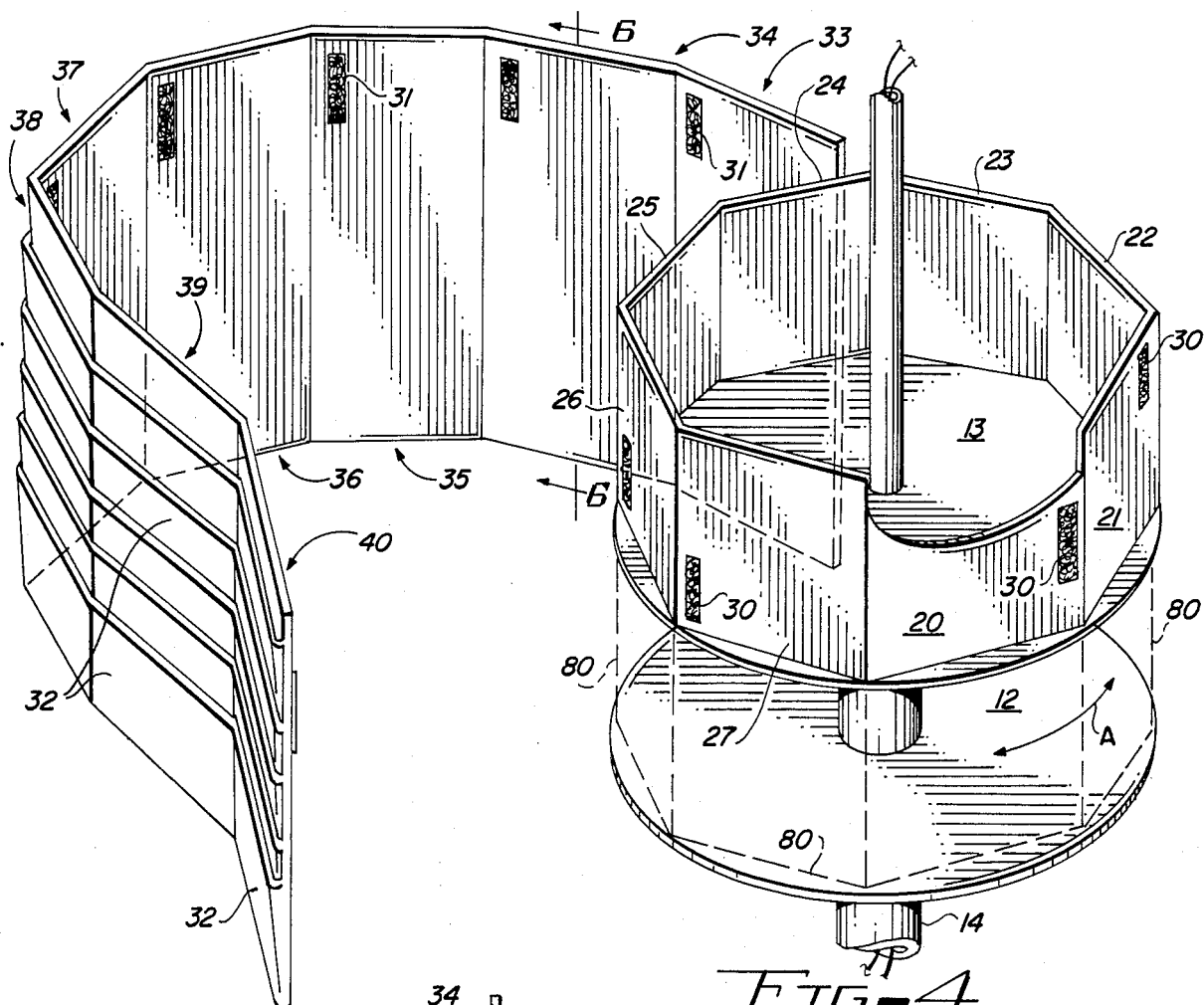
Fig-4
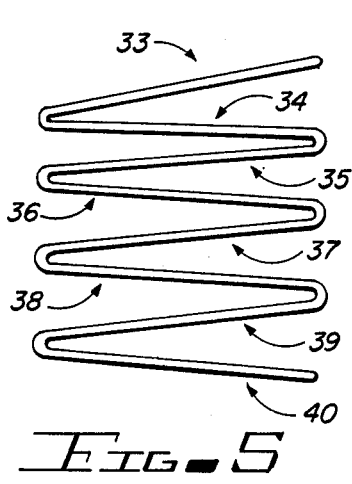
Fig-5
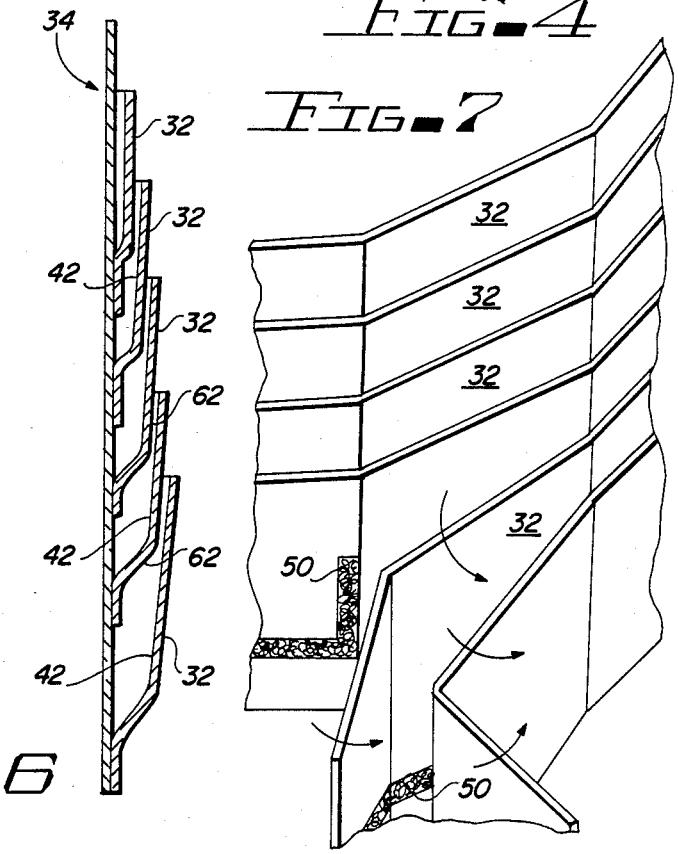
Fig-6
Fig-7

FLOPPY DISK STORAGE STAND

This invention relates to apparatus for displaying, storing, dispensing and transporting magnetic memory disks utilized in microcomputers and in apparatus which includes microcomputer control systems.

More particularly, the invention relates to a storage stand for magnetic memory disks, the stand both permitting individual disks stored on the stand to be quickly identified and facilitating the return of a disk removed from the stand to its assigned storage position on the stand.

In another respect, the invention relates to a magnetic disk storage stand which includes lightweight compact disk storage units which can be detached from the stand and readily transported on the person.

Magnetic floppy diskettes are widely utilized in connection with personal computers, electronic typewriters, word processing equipment, and other types of apparatus which include a microcomputer control system. Each floppy disk is provided with a paper envelope pocket which permits the disk to be conveniently handled without fingerprints being formed on the face or back of the disk. The top portion of the disk visably extends upwardly from the envelope pocket. Information describing the contents of the disk is inscribed on the upper portion of the disk so that a user holding the disk in its protective envelope can read the descriptive information.

Storage of floppy disks is customarily accomplished by placing the disks and their protective envelopes in a drawer-like container in the manner that reference catalogue cards for books are stored in file drawers in a public library. Alphabetized cards or other types of index markers are intermittently placed among the disks to facilitate location of particular disks. Commercially available floppy disk storage containers include the DISKBANK MEDIA MATE floppy disk drawer by Amaray Corporation of 2251 Grant Road, Los Altos, Calif. 94022; the RING KING 070 TRAY with hinged lid by Ring King Visibles, Inc. of 2210 Second Avenue, Muscatine, Iowa 52761, and the ROLLTOP 100 DISK FILE by Microcomputer Accessories, Inc. of 5721 Buckingham Parkway, Culver City, Calif. 90230. When floppy disks are stored in such containers, the top portions of only a few disks are visible at any time. A user must, in the manner that an individual flips through three by five cards in the card catalogue drawer of a public library, normally flip through the disks in the container to locate a desired disk. After several disks have been removed from the storage container and utilized, the user must again flip through the disks remaining in the container to locate the appropriate space in which to return used disks. Although such procedures are straightforward, they are sufficiently time consuming to often cause an individual utilizing multiple floppy disks to delay the return of a used disk to its protective envelope and to delay refilling the disk and envelope in the storage container. As a result, a plurality of disks and empty disk container envelopes accumulate on the top of a desk or other work area.

Floppy disks are relatively fragile and exhibit minimal resistance to bending, magnetic fields, static electricity, high humidity, and environmental pollutants like dust, cigarette smoke and epidermal oils. Disks and empty disk protective pocket envelopes laying on the top of a desk are especially susceptible to being soiled or otherwise damaged.

Other drawbacks of conventional floppy disk storage containers are that they occupy desk top space and cannot be readily carried on the person.

Accordingly, it would be highly desirable to provide an improved floppy disk storage unit which would permit individual disks stored in the unit to be rapidly identified, would permit protective disk envelope to remain in the unit when a disk was removed, would permit the storage slot for a removed disk to be readily identified so the disk could be promptly returned when the user finished utilizing the disk, would not occupy desk space, and would permit disks stored on the unit to be conveniently transported on the person.

Therefore, it is a principal object of the invention to provide improved apparatus for storing magnetic computer data disks.

A further object of the invention is to provide improved floppy disk storage apparatus which permits disks stored in the apparatus to be quickly viewed such that individual disks can be rapidly identified and removed from the storage apparatus.

Another object of the invention is to provide improved magnetic disk stoarge apparatus which permits an empty storage slot in the apparatus to be quickly matched with its assigned disk so the disk may be promptly returned to the storage device after use.

Still a further object of the instant invention is to provide a magnetic disk storage unit which does not occupy desk top space.

Yet another object of the invention is to provide magnetic disk storage apparatus which facilitates ready transportation on the person of disks stored in the apparatus.

These and other, further and more specific objects and advantages of the invention will be apparent to those skilled in the art from the following detailed description thereof, taken in conjunction with the drawings, in which:

FIG. 1 is a perspective view illustrating magnetic disk storage apparatus constructed in accordance with the principles of the invention;

FIG. 2 is a front section view of the apparatus of FIG. 1 illustrating further internal construction details thereof and taken along section line 2—2 thereof;

FIG. 3 is a top view of the apparatus of FIG. 1;

FIG. 4 is a perspective view of a portion of the apparatus of FIG. 1 illustrating the removable diskette storage strip thereof;

FIG. 5 is a top view of the removable disk storage strip of FIG. 4 illustrating the mode of operation thereof;

FIG. 6 is a side section view of the removable diskette storage strip of FIG. 4 taken along section line 6—6 thereof; and, FIG. 7 is a perspective view of an alternate embodiment of the removable diskette storage strip of FIG. 4.

Briefly, in accordance with my invention, I provide an improved storage stand for magnetic disks. The disks each include an upper portion and a lower portion. The storage stand includes a base; a carriage mounted on said base to rotate about a vertically disposed central axis, the carriage including an outer peripheral generally vertically oriented surface spaced away from and circumscribing the central axis; and, a plurality of storage pockets carried on said peripheral surface and each shaped and dimensioned to receive the lower portion of one of the magnetic disks such that the upper portion extends visably upwardly from the pocket.

Turning now to the drawings, which depict the presently preferred embodiments and best mode of the invention for the purpose of illustrating the practice thereof and not by way of limitation of the scope of the invention and in which like reference characters indicate corresponding elements throughout the several views, FIGS. 1-6 illustrate the presently preferred embodiment of the invention including circular shelves 11, 12, 13 rotatably mounted on upstanding shaft 14. Shelves 11, 12 rotate on bearings 15, 16, respectively, while shelf 13 rotates on bearings (not visible) inside shaft 14. Consequently, shelf 13 can be rotated independently of shelf pair 11, 12. Cylindrical supports 17 interconnect shelves 11, 12. Pole 18 is attached to the upper end of shaft 14. Pivotally interconnected arm units 20, 21 are secured to the upper end of pole 18 and permit the position of lamp 19 to be adjusted upwardly, downwardly and laterally in all directions.

Upstanding panel members 20-27 are connected to the upper surface of shelf 13 and circumscribe pole 18. Each panel member 20-27 is generally equidistant from pole 18. Theouter face of each panel member is provided with a strip of positive VELCRO TM fastening material 30. A flexible cloth strip is attached to the outer surface of panel members 20-27 by pressing strips of negative VELCRO TM fastening material 31 against positive hook and loop fastening strips 30. The cloth strip includes panel members 33-40 each provided with pockets 32 sized to receive floppy diskettes 41. Pockets 32 will receive diskettes 41 alone or will receive diskettes 41 in their protective paper pocket envelopes. Storage pockets 32 are preferably formed from fabric material which is elastic so that two or more disks 41 can be inserted in a single pocket. The inner surfaces 42, 62 (FIG. 6) of each pocket are comprised of a material which tends to frictionally or otherwise resist the removal from pocket 32 of a protective paper envelope for a disk. When surface 42 tends to retain a disk envelope, a disk 41 can be readily withdrawn from a pocket 32 without also removing the protective paper envelope from pocket 32. Pockets 32 are sized to permit the upper portion of a disk 41 to extend upwardly from the pocket (FIG. 1) so that identifying material 43 inscribed on the top portion of the disk is visible.

As shown in FIG. 5, after the fabric strip is detached from panels 20-27 it can be folded in accordian fashion to facilitate transport of the strip on the person. Panels 33-40 can be separated from one another and individually attached (or attached in pairs, in triplicate, etc.) to panels 20-27 to permit each panel 33-40 to be removed from drum 20-27 while other panel sections 33-40 remain attached to the drum. Cloth, paper, or other desired materials can be used to fabricate panels 33-40. The pocketed fabric strip of FIGS. 2, 4, 5 can be formed by interconnecting pockets 32 with positive VELCRO TM fastening strips 50 in the manner shown in FIG. 7. Although not visible in FIG. 7, each strip of pocket material 32 includes negative VELCRO TM strips on its back side which are opposed to and mate with strips 50.

In use, the storage stand of FIGS. 1 to 4 is positioned on the floor adjacent a computer work area. Floppy diskettes 41 or other types of disks or panel material are stored in pockets 32 in the manner illustrated in FIG. 1. The user rotates drum 20-27 in the directions indicated by arrows A to visually locate the desired floppy disk. Since the top portion of each disk carried in the drum is visible, the desired disk can be quickly located by rotating the drum, particularly if the disks are in alphabetical or numerical order or are color coded. Each panel 33-40 can be a differenc color to assist locating particular disks. Varying the number of pockets on each panel or providing designs on the panels which visually distinguish the panels from one another also facilitates location of particular disks. For example, in FIG. 1, a different number of symbols 61 is formed on each panel 33-40. When a disk 41 is removed from a pocket 32 on the storage drum, the protective disk paper envelope can be removed or left in the pocket 32.

When panel 40 is opened in the direction of arrow B (FIG. 3), a user has access to the space between shelves 12, 13. U-shaped groove 20 formed in panel 20 enables a seated individual to reach in to the central storage area circumscribed by panels 20-27. Shelves 11-13 are utilized to store office supplies, computer manuals, etc. The display stand of FIGS. 1-4 is sized so that shelf 13 is generally positioned at the eye level of an individual sitting in a chair adjacent the stand. Shaft 14 can be adapted so the length of shaft 14 and the height of shelf 13 from the floor can be adjusted.

The embodiments of the invention illustrated in the drawings are designed to occupy floor space adjacent a desk or work area. A desk top embodiment of the invention can be utilized and would consist of shelves 12, 13 and panels 20-27 circumscribed by fabric panels 33-40. Shelves 12, 13 would be rotatably mounted on a shortened vertical shaft 14 attached to a support base positioned immediately beneath and adjacent shelf 12. Shelves 12, 13 would be rotated about shaft 14 in unison.

Panels 20-27 can, as indicated by dashed lines 80 in FIG. 4, be elongated to span the distance between shelves 12, 13 and provide additional support for fabric panels 33-40.

Adjustable lamp 19 serves an important ergonomic function in the utilization of the storage stand of the invention. Lamp 19 may be conveniently adjusted to a position in which the lamp glare off of a computer CRT is minimized. A clipboard or other means for supporting documents or manuals may be attached to the outer end of arm 21 in addition to or in place of lamp 19. When a clipboard is attached to lamp arm 21 along with lamp 19, the clipboard is preferably positioned beneath lamp 19 so lamp 19 can be utilized to illuminate documents positioned on the clipboard. If desired, a DISKBANK MEDIA MATE floppy disk drawer manufactured by Amaray Corporation or other types of floppy disk and office supply storage containers can be placed on shelves 12, 13, or integrally formed with shelves 12, 13 or panels 20-27.

Having described my invention in such terms as to enable those skilled in the art to understand and practice it and having identified the presently preferred embodiments and best mode thereof, I claim:

1. A storage stand for panel-shaped objects, said panel-shaped objects including
    an upper portion, and
    a lower portion,
said stand including
    (a) a base;
    (b) a carriage mounted on said base for rotation about a vertically disposed central axis, said carriage including an outer peripheral vertically oriented face spaced away from and circumscribing said central axis, said outer face including a plurality of generally continuous vertically oriented flat planar surfaces, each of said planar surfaces being adjacent at least one other of said planar surfaces, each pair of adjacent planar surfaces forming an obtuse angle therebetween;

(c) a flexible strip of material including a plurality of interconnected panel-shaped members each having a front surface and a rear surface;

(d) means for detachably affixing said rear surface of each of said panel-shaped members to one of said vertically oriented planar surfaces of said carriage such that said flexible strip of material can be affixed to said outer circumscribing face of said carriage, said rear surfaces of an adjacent pair of said interconnected panel-shaped members forming an obtuse angle therebetween when said panel-shaped members are affixed to said face of said carriage; and, (e) a plurality of storage pockets carried on the front surface of each of said panel-shaped members and each shaped and dimensioned to receive said lower portion of one of said panel-shaped objects such that said upper portion extends visibly upwardly from said pocket, said flexible strip being adapted to be, when detached from said carriage, folded in accordion fashion such that one of said front surface, and back surface of each of said panel-shaped members is folded against and adjacent one of said front surface, and back surface of another panel-shaped member.

2. The storage stand of claim 1 wherein at least one of said storage pockets includes an inner surface comprised of a material which frictionally contacts one of said panel-shaped objects inserted in said pocket to resist removal of said panel-shaped object from said pocket.

3. The storage stand of claim 2 wherein said pocket comprises an elastic material.

4. The storage stand of claim 2 wherein said pockets are detachably affixed to said panel-shaped members.

* * * * *